(12) United States Patent
Hui et al.

(10) Patent No.: US 9,784,258 B2
(45) Date of Patent: Oct. 10, 2017

(54) MICROFLUIDIC OSCILLATOR PUMP UTILIZING A RING OSCILLATOR CIRCUIT IMPLEMENTED BY PNEUMATIC OR HYDRAULIC VALVES

(71) Applicant: The Regents of The University of California, Oakland, CA (US)

(72) Inventors: Elliot E. Hui, Irvine, CA (US); Philip N. Duncan, Fullerton, CA (US); Transon V. Nguyen, Cambridge, MA (US)

(73) Assignee: The Regents of The University of California, Oakland, CA (US)

( * ) Notice: Subject to any disclaimer, the term of this patent is extended or adjusted under 35 U.S.C. 154(b) by 275 days.

(21) Appl. No.: 14/029,286

(22) Filed: Sep. 17, 2013

(65) Prior Publication Data

US 2014/0079571 A1    Mar. 20, 2014

Related U.S. Application Data

(60) Provisional application No. 61/702,709, filed on Sep. 18, 2012, provisional application No. 61/813,099, filed on Apr. 17, 2013.

(51) Int. Cl.
| | |
|---|---|
| *F04B 19/00* | (2006.01) |
| *F16K 99/00* | (2006.01) |
| *F04B 43/12* | (2006.01) |
| *F04B 53/10* | (2006.01) |

(52) U.S. Cl.
CPC ............ *F04B 19/006* (2013.01); *F04B 43/12* (2013.01); *F04B 53/10* (2013.01); *F16K 99/0015* (2013.01); *F16K 99/0034* (2013.01); *F16K 99/0059* (2013.01); *F16K 2099/0094* (2013.01)

(58) Field of Classification Search
CPC ...... F04B 19/006; F04B 43/14; F04B 43/095; F04B 43/09; F04B 43/12; F04B 45/067; F04B 45/08; F04B 49/06; F04B 49/065; F04B 39/08; F04B 39/10; F04B 53/10;
(Continued)

(56) References Cited

U.S. PATENT DOCUMENTS

| | | | | |
|---|---|---|---|---|
| 5,247,208 A | * | 9/1993 | Nakayama | ............. G05F 3/205 327/214 |
| 2007/0237686 A1 | * | 10/2007 | Mathies | ............ B01L 3/502738 422/400 |

(Continued)

OTHER PUBLICATIONS

The Basics—Very Basic Circuits.*
Annealing (metallurgy).*

*Primary Examiner* — Devon Kramer
*Assistant Examiner* — Christopher Brunjes
(74) *Attorney, Agent, or Firm* — Nguyen & Tarbet Patent Law Firm

(57) ABSTRACT

Microfluidic oscillator circuits and pumps for microfluidic devices are provided. The microfluidic pump may include a plurality of fluid valves and a microfluidic oscillator circuit having an oscillation frequency. The fluid valves may be configured to move fluids. Each fluid valve may be connected to a node of the microfluidic oscillator circuit. The pumps may be driven by the oscillator circuits such that fluid movement is accomplished entirely by circuits on a microfluidic chip, without the need for off-chip controls.

1 Claim, 12 Drawing Sheets

(58) Field of Classification Search
CPC ............ F16K 99/0015; F16K 99/0059; F16K 99/0034; F16K 2099/0094
USPC ................................ 137/825, 829, 830, 833
See application file for complete search history.

(56) References Cited

U.S. PATENT DOCUMENTS

| | | | | |
|---|---|---|---|---|
| 2008/0289710 A1* | 11/2008 | Unger | ............... | B01L 3/502707 |
| | | | | 137/833 |
| 2011/0105945 A1* | 5/2011 | Videbaek | ........... | A61B 10/0275 |
| | | | | 600/567 |
| 2011/0301535 A1* | 12/2011 | Takayama | ......... | B01L 3/502738 |
| | | | | 604/93.01 |
| 2013/0202453 A1* | 8/2013 | Hong | ..................... | F04B 19/24 |
| | | | | 417/53 |
| 2013/0255799 A1* | 10/2013 | Devaraju | ................. | F17D 3/00 |
| | | | | 137/488 |

* cited by examiner

MICROFLUIDIC OSCILLATOR PUMP UTILIZING A RING OSCILLATOR CIRCUIT IMPLEMENTED BY PNEUMATIC OR HYDRAULIC VALVES

CROSS REFERENCE TO RELATED APPLICATIONS

This application claims priority to and commonly assigned U.S. Provisional Patent Application No. 61/702,709, filed on Sep. 18, 2012, entitled "Microfluidic Digital Logic Circuits for Control of Liquid Handling," by Hui et al, and to and commonly assigned U.S. Provisional Patent Application No. 61/813,099, filed on Apr. 17, 2013, entitled "Pneumatic Oscillator Circuits for Timing and Control of Integrated Microfluidics", by Duncan et al, which are incorporated herein by reference in its entirety for all purposes.

STATEMENT REGARDING FEDERALLY SPONSORED RESEARCH

This invention was made with Government support under National Science Foundation grant ECCS-1102397, and Defense Advanced Research Projects Agency grant N66001-10-1-4003. The Government has certain rights in this invention.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present invention relates to microfluidic devices. The integration of laboratory operations on a microfluidic device has numerous applications in medical diagnostics and biological science. Research into microfluidic devices, which perform various functions for biochemical reactions using biochemical fluids, such as blood, urine, saliva and sputum, for example, and detect the results thereof, has been actively pursued. Microfluidic devices may be of a chip type such as a lab-on-a-chip or of disk type such as a lab-on-a-disk. The lab-on-a-chip and lab-on-a-disk have received much attention in chemical and biotechnology fields since such devices may increase reaction rates, be automated, be made portable, and use a small amount of reagent. A microfluidic device typically includes a microchannel, through which a fluid flows, and a microvalve, which controls the flow of fluid in the microchannel. In a microfluidic device, the microvalve or microvalves control the transfer, mixing, accurate metering, biochemical reaction, isolation and detection of a sample in the microfluidic device of a chip type such as a lab-on-a-chip.

A variety of liquid handling operations can be performed using microfluidics technology, thus allowing complex laboratory assays to be automated on a compact chip. Integrated microfluidics is a technology that allows valves and pumps to be built right on the microfluidics chip, thus allowing complex liquid handling and a high degree of multiplexing. In order to execute the required liquid handling operations, the valves and pumps on the chip must be activated at the proper time. Typically, this is achieved by computer controlled pneumatic actuators that sit outside of the chip itself and are connected to the chip through a network of tubing. While this has worked well in engineering laboratories, the considerable amount of off-chip machinery is too cumbersome and complex for general use. The need for off-chip controls introduces significant disadvantages in terms of size, cost, ease of use, and reliability. The implementation of digital logic circuits out of microfluidic valves and channels could potentially enable fully self-contained systems that are controlled by onboard circuitry, thus eliminating the need for off-chip controls.

SUMMARY

In one aspect, the invention features a microfluidic pump, located on a microfluidic device. The microfluidic pump includes a microfluidic oscillator circuit having an oscillation frequency, and a plurality of fluid valves configured to move fluids. Each fluid valve is connected to a node of the microfluidic oscillator circuit.

Various implementations of the invention may include one or more of the following features. The microfluidic oscillator circuit includes an odd number of inverter logic gates implemented by pneumatic or hydraulic valves. The logic gates are connected in a closed loop. The microfluidic oscillator circuit also includes a plurality of nodes, wherein each node is located between two inverter logic gates.

The oscillation frequency varies as a function of the number of inverter logic gates in the oscillator circuit. The oscillation frequency of the circuit varies as a function of the pull-up resistance of the inverter logic gates of the circuit, wherein each inverter logic gate includes a pull-up resistor having a pull-up resistance. The oscillation frequency varies as a function of the supply vacuum pressure, wherein the supply vacuum pressure is provided by a vacuum line of the microfluidic pump. The supply vacuum pressure is provided by a vacuum source, wherein the vacuum source is one of: a syringe and a pump.

The microfluidic oscillator circuit has a volume comprising the volume of the pneumatic or hydraulic valves and the volume of the channels connecting the pneumatic or hydraulic valves. The oscillation frequency varies as a function of the volume of the microfluidic oscillator circuit. The oscillation frequency of the oscillator circuit is between about 2.0 Hz and 5.0 Hz.

Thermal annealing of the oscillator circuit improves stability of the oscillation frequency of the oscillator circuit. Moreover, short-term variance of the oscillation frequency varies as a function of a count of the inverter logic gates included in the microfluidic oscillator circuit.

The microfluidic oscillator circuit is configured to generate an oscillating control signal for moving the fluids through the plurality of fluid valves. The microfluidic circuit is configured to direct peristaltic pumping of fluids through the fluid valves by causing the plurality of fluid valves to open and close in a coordinated manner.

The microfluidic pump is configured to transport a fluid from a first region of the microfluidic device to a second region of the microfluidic device. The microfluidic pump is configured to transport a fluid onto the microfluidic device from a region outside of the microfluidic device. The microfluidic pump is configured to transport a fluid from a first region on the microfluidic device to a second region off the microfluidic device. The microfluidic pump is configured to mix, meter, recirculate, or agitate fluids on the microfluidic device.

In another aspect, the invention features a microfluidic pump, located on a microfluidic device. The microfluidic pump comprises a microfluidic oscillator circuit, which includes five inverter logic gates implemented by five pneumatic or hydraulic valves, the logic gates being connected in a closed loop, and a plurality of nodes, each node being located between two logic gates. The microfluidic pump also comprises three fluid valves configured to move fluids. A first fluid valve is connected to a first node between a first and second logic gate. A second fluid valve is connected to a second node between a third and fourth logic gate. A third fluid valve is connected to a third node between a fifth logic gate and the first logic gate.

Various implementations of the invention may include one or more of the following features. The microfluidic oscillator circuit is configured to generate an oscillating control signal to direct peristaltic pumping of fluids through the fluid valves by causing the plurality of fluid valves to open and close in a coordinated manner.

In yet another aspect, the invention features a microfluidic oscillator circuit located on a microfluidic device. The oscillator circuit includes an odd number of inverter logic gates implemented by pneumatic or hydraulic valves, the logic gates being connected in a closed loop, and a plurality of nodes, each node being located between two inverter logic gates. The microfluidic oscillator circuit is configured to generate an oscillating control signal for timing and synchronization of actions on the microfluidic device. The oscillating control signal has an oscillation frequency.

Various implementations of the invention may include one or more of the following features. The oscillating control signal is configured to direct peristaltic pumping of fluids through a plurality of fluid valves by causing the fluid valves to open and close in a coordinated manner.

The invention can include one or more of the following advantages. Laboratory operations on a microfluidic device may be controlled by circuitry located directly on the microfluidic device. This eliminates the need for off-chip controls that may be too cumbersome and complex for general use. On-chip controls provide advantages in terms of size, cost, ease of use, and reliability. A microfluidic ring oscillator circuit connected to a series of in-line fluid valves allows for autonomous operation of a peristaltic pump in handling liquids on a microfluidic device. Further, the present invention facilitates execution of on-chip control of fluid systems for precise metering, dilution, and reaction of multiple reagents. The microfluidic ring oscillator circuit may provide a reliable frequency reference for microfluidic digital logic circuits, providing a critical component towards achieving fully integrated microfluidic systems. The invention takes a step toward complete elimination of off-chip control elements, such as valve manifolds, and paves the way for a fully contained lab-on-a-chip without dependence on electricity.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings that illustrate specific embodiments of the present invention.

DETAILED DESCRIPTION

Reference will now be made in detail to some specific embodiments of the present invention including the best modes contemplated by the inventor for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. For example, the techniques of the present invention will be described in the context of glass microfluidic devices, although other embodiments such as plastic or polymer devices could also be used.

It should be noted that the fluid control structures suitable for use in microfluidic devices can be applied to a variety of microfluidic devices. A pathogen detection system is a good example of one possible application that can benefit from the use of fluid control structures. Also, it should be noted that a fluid is considered to be an aggregate of matter in which the molecules are able to flow past each other, such as a liquid, gas or combination thereof, without limit and without fracture planes forming. Moreover, while references may primarily be made to pneumatic implementations of the claimed invention, it should be noted that the claimed invention may be implemented using a hydraulic microfluidic circuit. In the following description, numerous specific details are set forth in order to provide a thorough understanding of the present invention. The present invention may be practiced without some or all of these specific details. In other instances, well known operations have not been described in detail in order not to unnecessarily obscure the present invention.

Furthermore, techniques and mechanisms of the present invention will sometimes be described in singular form for clarity. However, it should be noted that some embodiments can include multiple iterations of a technique or multiple instantiations of a mechanism unless noted otherwise.

Implementations of the invention may include a microfluidic oscillator circuit comprising an odd number of pneumatic or hydraulic inverter logic gates implemented by a plurality of pneumatic or hydraulic valves, the logic gates being connected in a closed loop. This configuration creates a stable oscillatory behavior upon application of vacuum power to the circuit. Ring oscillators are highly useful in semiconductor process control, as the output frequency is easy to measure and gives insight into a number of physical device parameters. Likewise, microfluidic ring oscillators may prove useful as a characterization tool in the development of an analytical model for pneumatic circuits.

Figure 1A:
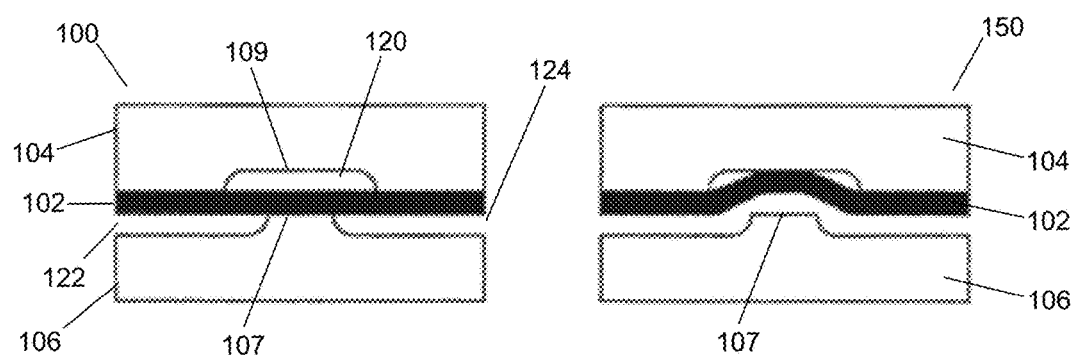
FIGS. 1A and 1B are diagrammatic views of a pneumatic membrane valve.
Figure 1B:
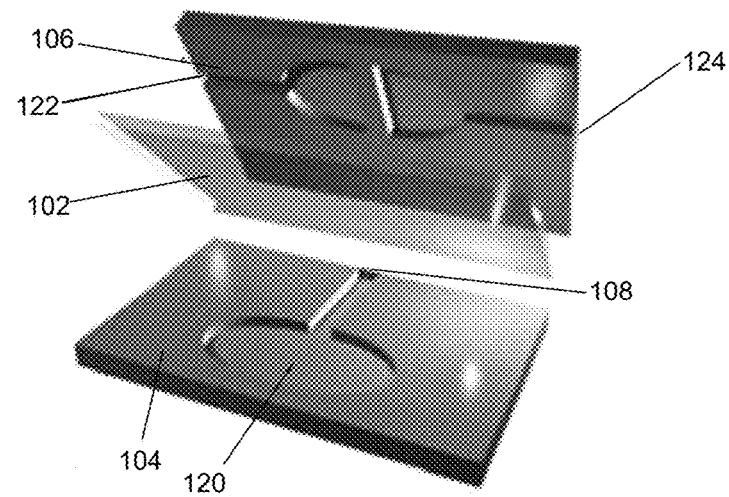

FIGS. 1A and 1B are diagrammatic views of a pneumatic membrane valve 100. As shown, a polydimethylsiloxane (PDMS) membrane 102 is sandwiched between two wafers or substrates 104 and 106. When a vacuum is applied to a control channel 108, the membrane 102 is pulled from its valve seat 107 into a displacement chamber 120 to abut against a wall 109 of the displacement chamber. FIG. 1A shows an example of a membrane valve in default position 100 and a membrane valve in deformed position 150 when a vacuum is applied to the control channel 108. In some implementations, the valve seat 107 and the two substrates 104 and 106 are made of glass. As such, fluid is free to flow from an input channel 122 to an output channel 124. The nature of the glass-PDMS bond makes the valve effective for controlling on-chip flows of gas as well. Details regarding the structure and construction of the pneumatic membrane valve 100 are disclosed in U.S. Pat. No. 7,445,926, filed Dec. 29, 2003, entitled "Fluid Control Structures in Microfluidic Devices", which is incorporated herein by reference.

Figure 2A:
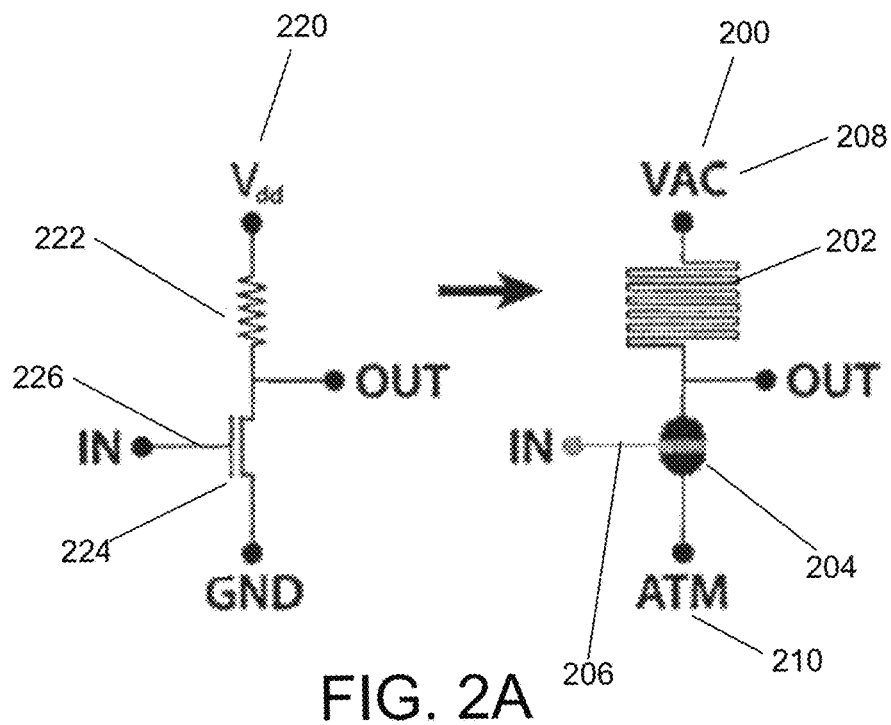
FIG. 2A is a diagrammatic representation of a pneumatic inverter logic gate and an electronic inverter logic gate using an n-channel field effect transistor.

A pneumatic inverter logic gate may utilize such a pneumatic membrane valve that is closed at rest and opened by applying vacuum to the gate input. FIG. 2A is a diagrammatic representation of a pneumatic inverter logic gate 200 and an electronic inverter logic gate 220 using an n-channel field effect transistor 224. The pneumatic inverter logic gate 200 can be thought of analogously to the electronic gate 220, as both are normally-off devices. Pneumatic logic gates and circuits can be constructed by mimicking the n-channel MOSFET (NMOS) logic family of electronics, with transistors 224 replaced by valves 204, wires 226 replaced by channels 206, and electronic pull-up resistors 222 replaced by long, narrow microfluidic channel pull-up resistors 202, wherein the pull-up resistance of the pull-up resistors 202 varies as a function of the length of the long, narrow microfluidic channels comprising the pull-up resistors 202. Instead of being powered by a voltage differential as in electronics, these circuits are powered by a pressure differential. A vacuum line may provide supply vacuum (VAC) pressure 208 to the microfluidic chip. In some implementations, the oscillation frequency of the oscillator circuit may vary as a function of the supply vacuum pressure 208. VAC may be defined to be the supply and atmospheric (ATM) pressure 210 to be the ground, wherein VAC represents binary 1, and ATM represents binary 0. This maintains the analogy to NMOS logic, since the membrane valves open with an input of 1. All of the fundamental Boolean operations are possible in this technology. In the case of a binary inverter, an input (IN) of 1 opens the valve 204 and pulls down the output (OUT) to 0, whereas an input (IN) of 0 closes the valve, allowing current through the pull-up resistor 202 to bring the output (OUT) to 1.

Vacuum-driven pneumatic logic gates exhibit high non-linear gain, which is critical for noise suppression in digital systems and allows for fan-out and cascading. It is likely that gain occurs because the adhesion of the membrane to the valve seat dominates over the mechanical elasticity of the membrane, thus causing the valve to remain fully closed below a threshold pressure and to snap fully open quickly once that threshold is exceeded and adhesion is broken. Importantly, this intrinsic non-linear gain is not present in pressure-driven pneumatic and hydraulic approaches. Instead, additional engineering has been required in order to achieve gain in these other logic technologies. Additionally, pneumatic logic is advantageous over hydraulic logic due to the two orders-of-magnitude difference in viscosity between water and air, resulting in a significant inherent speed advantage for pneumatics.

Figure 2B:
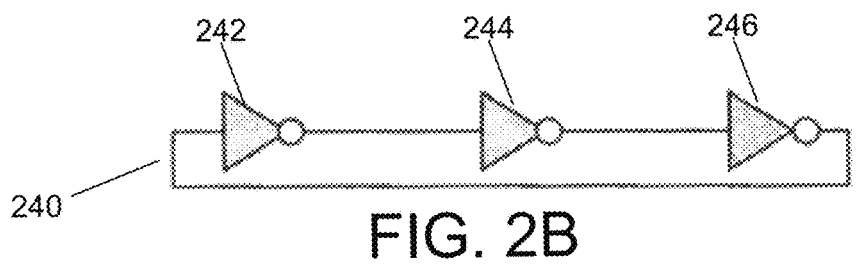
FIGS. 2B and 2C are diagrammatic representations of a 3-inverter oscillator circuit.
Figure 2C:
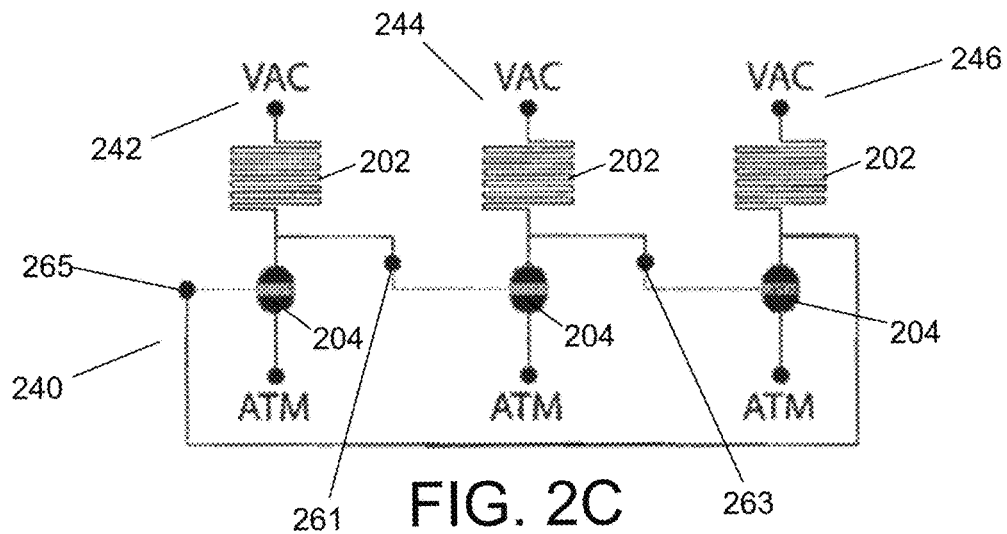

FIGS. 2B and 2C are diagrammatic representations of a 3-inverter oscillator circuit 240. FIG. 2B provides a schematic representation of the three pneumatic inverter logic gates 242, 244, and 246 in a closed loop, and FIG. 2C provides an exploded diagrammatic representation of the three-inverter oscillator circuit 240, with details regarding the logic gate components that are included in the inverter logic gates 242, 244, and 246. Nodes 261, 263, and 265 are located between the logic gates 242, 244, and 246. As noted in FIG. 2C, each logic gate includes a pneumatic valve 204, a pull-up resistor 202, an input, an output, and connections to VAC and ATM. Due to the delay provided by each of the inverter logic gates, the binary values at the nodes oscillate in a coordinated manner and at an oscillation frequency, and the resulting oscillation provides a frequency reference for operations on a microfluidic chip. In some implementations, the oscillation frequency of the circuit is between approximately 2.0 Hz and 5.0 Hz. In other implementations, the oscillation frequency may be less or greater than that specified range. While FIGS. 2B and 2C depict a 3-inverter oscillator circuit, it should be noted that any odd number of inverter logic gates may be used to implement an oscillator circuit.

Frequency references are fundamental to most digital systems, providing the basis for process synchronization, timing of outputs, and waveform synthesis. Various implementations of the claimed invention describe pneumatic oscillator circuits built from microfluidic valves and channels. Pneumatic circuits are best described by compressible-flow analysis that differs fundamentally from conventional circuit theory. Implementations of the invention also provide for optimization of oscillator stability and demonstration of more complex circuits for the generation of phase-shifted waveforms and optimized peristaltic pumping. Thus, pneumatic oscillators can serve as on-chip frequency references for microfluidic digital logic circuits, providing a critical component towards achieving fully integrated microfluidic systems. In some implementations, the oscillator circuits depicted in FIGS. 2B and 2C may be used to generate an oscillating control signal for timing and synchronization of various actions to be performed on a microfluidic device. Peristaltic pumping of fluids in a microfluidic device, further described below, is just one example of how the oscillator circuits of FIGS. 2B and 2C may be used for timing and synchronization purposes.

The complexity of microfluidic systems has exploded over the past decade, achieving highly multiplexed, automated operations by integrating up to thousands of pumps and valves onto a single chip, as disclosed in U.S. Pat. No. 7,766,033, filed Mar. 21, 2007, entitled "Multiplexed Latching Valves for Microfluidic Devices and Processors", which is incorporated herein by reference. Typically in microfluidic large-scale integration, valves are actuated by an off-chip pneumatic source gated by mechanical solenoid valves under computer control. This modular and intuitive approach has seen great success. However, the complexity of the off-chip components and connections are detrimental to cost and reliability, posing a barrier to widespread adoption. Next-generation microfluidic systems are envisioned to contain embedded controls, enabling self-contained devices that can autonomously execute a set of preprogrammed operations. An elegant solution would be to perform digital logic operations within the microfluidic circuits themselves, thus eliminating the need for machinery to interface between the electrical and fluidic realms. Fundamental building blocks, such as Boolean logic gates, memory latches, and frequency-sensitive valves, as well as more complex systems such as shift registers and adders, have been implemented employing elastomeric valves as transistor analogues. Digital logic operations have also been employed by using microfluidic droplets to represent binary information.

While a number of digital components have been achieved, the lack of on-chip timing references has remained a key barrier to achieving fully autonomous microfluidic systems. Other systems have generally required off-chip timing signals to provide synchronization between different circuit blocks, to drive peristaltic pumping, or to coordinate the timing of biochemical reactions. Demonstrations of self-oscillating hydraulic and pneumatic circuits represent an important step towards achieving frequency references, but these demonstrations do not pursue the task of optimizing oscillator stability and include no demonstration of leveraging oscillators for system integration. Some implementations of the present invention provide a microfluidic ring oscillator circuit that provides an on-chip frequency reference for peristaltic pumping of fluids on a microfluidic chip.

On-chip peristaltic pumping has been critical in enabling the integrated microfluidics revolution of the past decade. Pumping requires a set of valves to be rapidly opened and closed in a highly coordinated manner, which usually necessitates off-chip control signals. The different nodes within a ring oscillator circuit each follow square wave functions that are phase-shifted with respect to one another. Peristaltic pumping may be successfully achieved by driving three in-series liquid valves directly from the nodes of a 3-inverter ring oscillator. In other implementations, one or more inverters may be used in the ring oscillator. In another implementation, fewer or more liquid valves may be used to achieve peristaltic pumping.

Figure 3A:
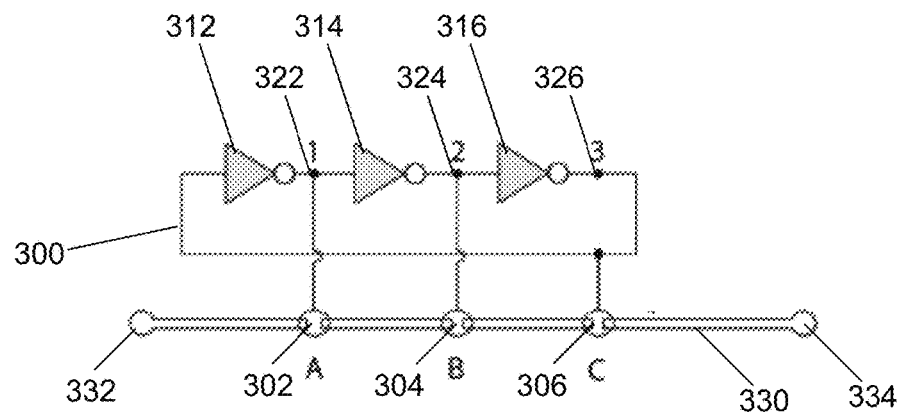
FIG. 3A is a diagrammatic representation of an oscillator pump, including a three-inverter ring oscillator circuit coupled with three in-line fluid valves for peristaltic pumping of fluids from a fluid inlet through the three fluid valves to a fluid outlet.

As an example, FIG. 3A is a diagrammatic representation of an oscillator pump, including a three-inverter ring oscillator circuit 300 coupled with three in-line fluid valves 302 (valve A), 304 (valve B) and 306 (valve C) of a fluid channel 330, for peristaltic pumping of fluids from a fluid inlet 334 through the three fluid valves A, B and C to a fluid outlet 332. Each of valves A, B, and C are connected to one of node 322 (node 1), node 324 (node 2), and node 326 (node 3), respectively, of the ring oscillator circuit. In this example, the ring oscillator circuit 300 includes three inverter logic gates 312, 314 and 316, in a closed loop.

When the output of logic gate 312 at node 1 has a value of binary 1, the vacuum supply pressure is applied to valve A, deforming the valve membrane of valve A, as depicted in the valve 150 of FIG. 1A, to open valve A to allow fluid to flow through. When the output of logic gate 312 at node 1 has a value of binary 0, no vacuum pressure is applied to valve A, so the valve membrane of valve A remains closed, such that fluid is not allowed to flow through valve A. Valves B and C operate similarly, depending on the output values at nodes 2 and 3, respectively.

Because of the delay provided by each logic gate 312, 314 and 316 in the ring oscillator circuit 300, the output values at nodes 1, 2, and 3 oscillate in a sequential and coordinated manner between binary 1 and binary 0.

Figure 3B:
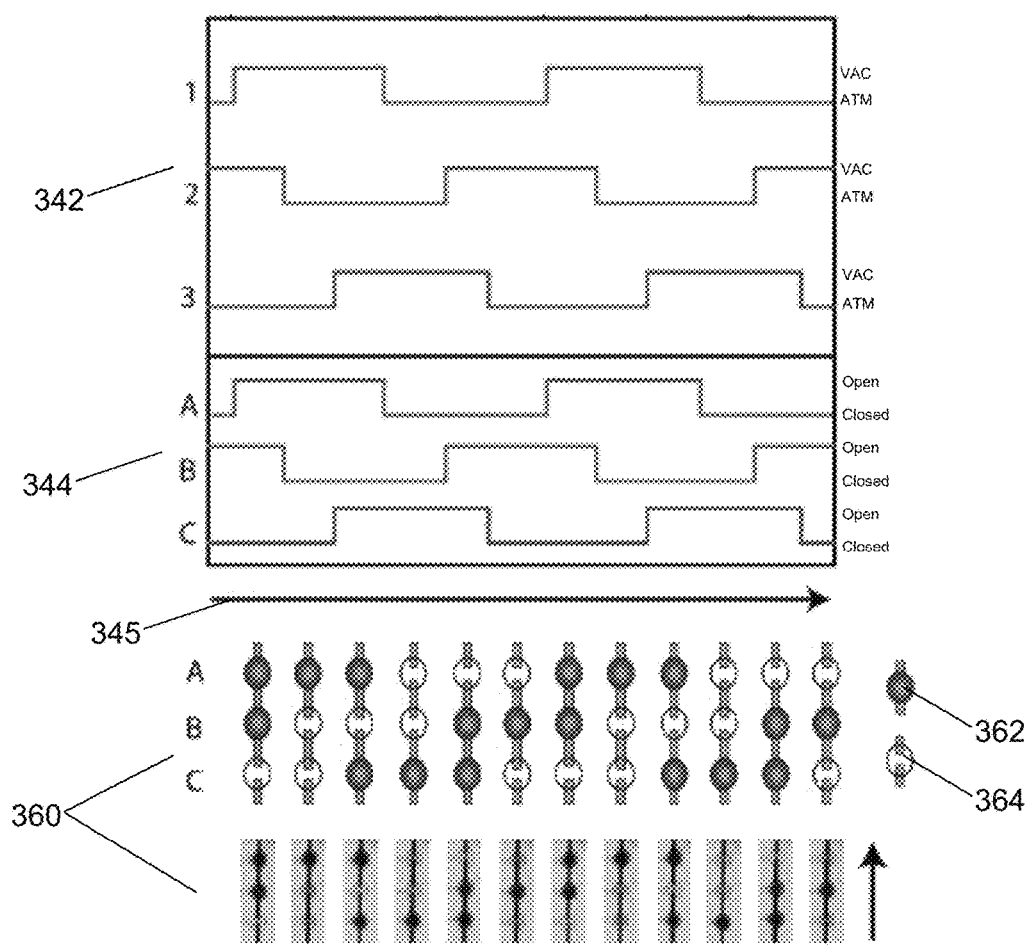
FIG. 3B is a graphical representation of the output values at nodes 1, 2, and 3 of FIG. 3A and a graphical and diagrammatic representation of the opening and closing of valves A, B, and C of FIG. 3A as a function of time.

FIG. 3B is a graphical representation 342 of the output values at nodes 1, 2, and 3, and a graphical 344 and diagrammatic 360 representation of the opening and closing of valves A, B, and C as a function of time 345. The output values of nodes 1, 2 and 3 may be one of VAC or ATM, depending on the output of the logic gates, with VAC corresponding to a binary 1 value and ATM corresponding to a binary 0 value. Due to the delay inherent in the logic gates, the square waveforms for the nodes are offset from each other, as are the square waveforms for the opening and closing of valves A, B, and C. The waveform for a fluid valve (e.g. valve A) corresponds to the waveform of the node to which the valve is connected (e.g. node 1). The pumping pattern graph 360 demonstrates how fluid is moved through the valves as the valves open and close in a coordinated manner. The shaded valves 362 represent open valves and the non-shaded valves 364 represent closed valves. As valves A, B, and C open and close in a coordinated oscillatory manner, fluids may be moved through the open valves by the oscillator pump as time progresses.

Increasing the number of inverter logic gates and connecting each fluid valve to a different node in the oscillator circuit may produce a peristaltic pump pattern that is more efficient than that produced by a 3-inverter ring oscillator circuit.

Figure 4A:
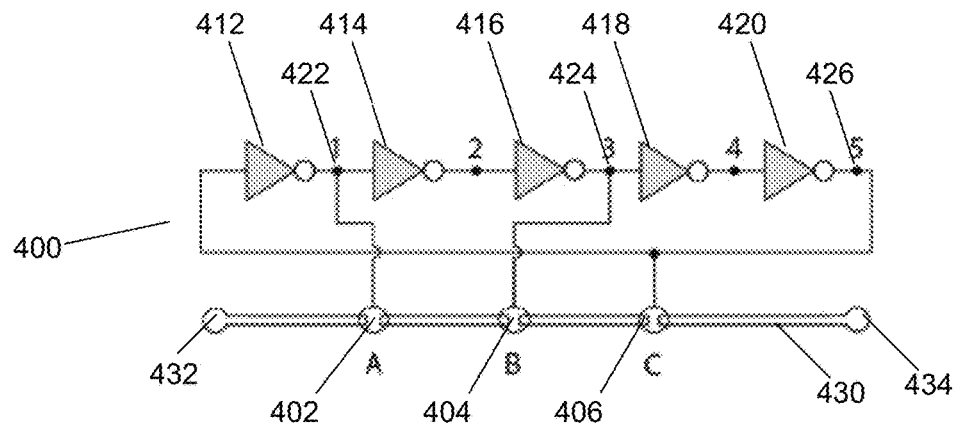
FIG. 4A is a diagrammatic representation of an oscillator pump, including a five-inverter ring oscillator circuit coupled with three in-line fluid valves, for peristaltic pumping of fluids from a fluid inlet through the three fluid valves to a fluid outlet.

As an example, FIG. 4A is a diagrammatic representation of an oscillator pump, including a five-inverter ring oscillator circuit 400 coupled with three in-line fluid valves 402 (valve A), 404 (valve B) and 406 (valve C) of a fluid channel 430, for peristaltic pumping of fluids from a fluid inlet 432 through the three fluid valves A, B and C to a fluid outlet 434. Each of valves A, B, and C are connected to one of node 422 (node 1), node 424 (node 3), and node 426 (node 5), respectively, of the ring oscillator circuit. In this example, the ring oscillator circuit 300 includes five inverter logic gates 412, 414, 416, 418 and 420, in a closed loop. It should be noted that the valves may alternatively be connected to other nodes of the five-inverter circuit.

The opening and closing of valves A, B, and C in the five-inverter circuit 400 operate similarly to those of the three-inverter circuit 300 to produce a coordinated, oscillatory pumping sequence among the valves.

Figure 4B:
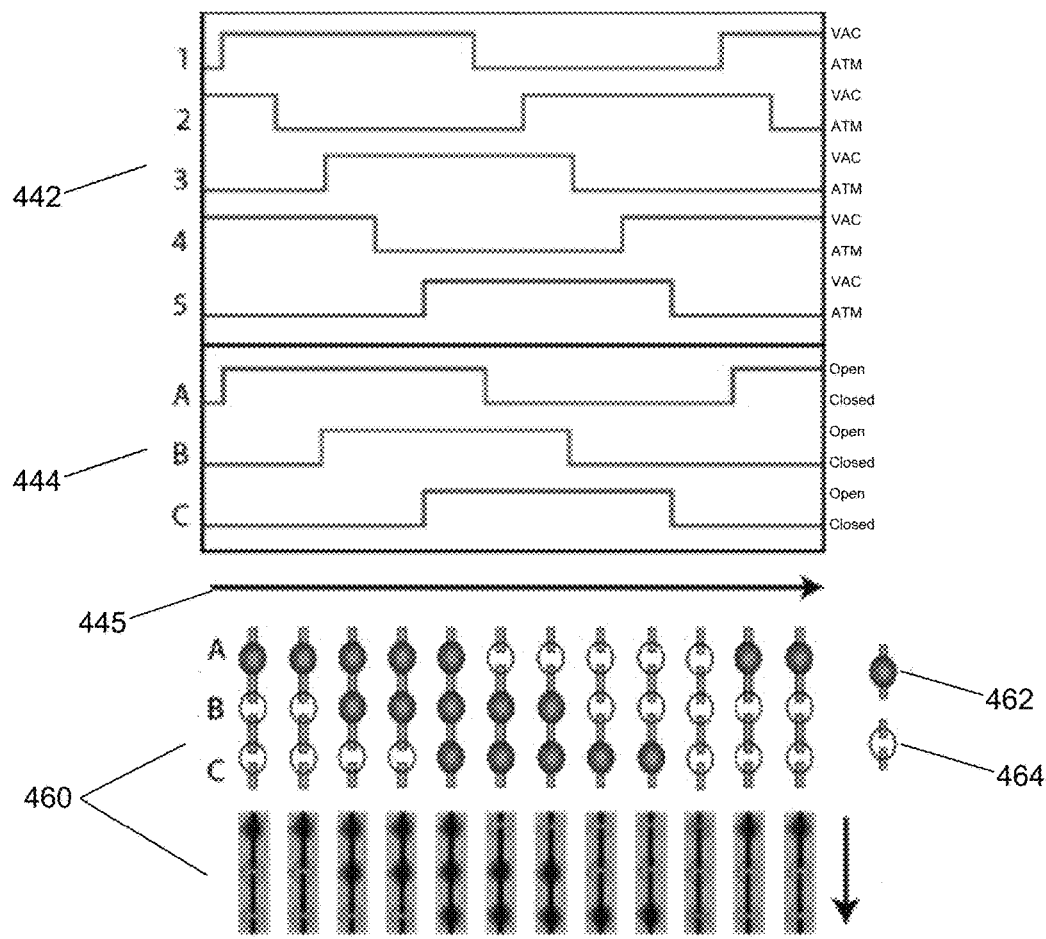
FIG. 4B is a graphical representation of the output values at nodes 1, 2, 3, 4, and 5 of FIG. 4A, and a graphical and diagrammatic representation of the opening and closing of valves A, B, and C of FIG. 4A as a function of time.

FIG. 4B is a graphical representation 442 of the output values at nodes 1, 2, 3, 4, and 5, and a graphical 444 and diagrammatic 460 representation of the opening and closing of valves A, B, and C as a function of time 445. Similar to the waveforms of FIG. 3B for the three-inverter circuit, the square waveforms for the nodes are offset from each other, as are the square waveforms for the opening and closing of valves A, B, and C. The waveform for valve A corresponds to the waveform of the node to which the valve is connected, i.e. node 1. The waveform for valve B corresponds to the waveform of node 3, and the waveform for valve C corresponds to the waveform of node 5. The pumping pattern graph 460 demonstrates how fluid is moved through the valves as the valves open and close in a coordinated manner. The shaded valves 462 represent open valves and the non-shaded valves 464 represent closed valves. As valves A, B, and C open and close in a coordinated oscillatory manner, fluids may be moved through the open valves by the oscillator pump as time progresses.

The resulting pumping sequence permits fluids to be pumped through the valves at a higher rate. This "double chamber" pumping sequence, which is generated by properly selecting the three nodes (nodes 1, 3 and 5) of the 5-inverter ring oscillator, provides a significant improvement in pump efficiency, with the 5-inverter system pumping at 14.7 µL/min compared to 10.7 µL/min for the 3-inverter system.

Peristaltic pumping is a powerful tool that may enable highly versatile routing of liquids on chip, including recirculation around closed loops. On-chip control of peristaltic pumping may be leveraged to demonstrate metering, mixing, incubation, and washing on an integrated chip with minimal external input, as discussed below.

The microfluidic pump described herein may be used in a liquid-handling chip to enable on-chip fluid control, including systems for precise metering, dilution, and reaction of multiple reagents. Typically, such devices rely upon unwieldy off-chip pneumatic and electronic components that interface to the chip through a maze of tubing. Some implementations of the claimed microfluidic pump may potentially enable fully self-contained systems that are controlled by onboard circuitry, eliminating the need for off-chip controls.

In these implementations, multiple peristaltic pumps are integrated in a ring mixer architecture and a combinatorial logic block is added for selective activation of the required pumps and valves to execute four functions: meter, where two liquids are loaded into the device at a specific ratio; mix, where the liquids are mixed together using an on-chip rotary pump; incubate, where the liquid mixture is left stationary (e.g. for timed reactions); and wash, where the mixing chamber is flushed with a buffer solution. Each of the four states is switched on by the activation of a single input line. A network of Boolean logic gates then routes control signals to the appropriate components in order to accomplish the selected function. Thus, an operator can select between a set of integrated microfluidic operations without the need for computer control.

The microfluidic pump described herein may be fabricated as follows. Channels and valves may be patterned in glass wafers by photolithography and hydrofluoric acid (HF) etching. Access holes for off-chip connections are drilled through the glass with diamond-tipped grinding bits. Via holes are punched through 250 mm thick PDMS membranes. Finally, two complementary glass wafers and a matching PDMS membrane are aligned and assembled, with the membrane in the middle of the stack. Adhesion forces between the PDMS and glass wafers are sufficient to hold the device together.

Resistor values may be determined via circuit modeling using a mixed signal emulator. Pneumatic resistances are calculated based on channel dimensions to form a lumped-element resistor network that is modeled as an equivalent electrical circuit, where the ratios of the electrical resistances correspond to the ratios of the pneumatic resistances in the microfluidic circuit. Valves are approximated as either perfect conductors or infinite resistors, depending on their opened or closed state. Resistor values are then adjusted in order to achieve the desired steady state transfer function behavior in the circuit model. Electrical voltage swings between the supply and ground voltage levels corresponded well to pneumatic pressure swings between the supply and ground pressure levels; thus, the behavior of the pneumatic circuit could be predicted effectively by the behavior of the modeled electrical circuit.

Figure 5:
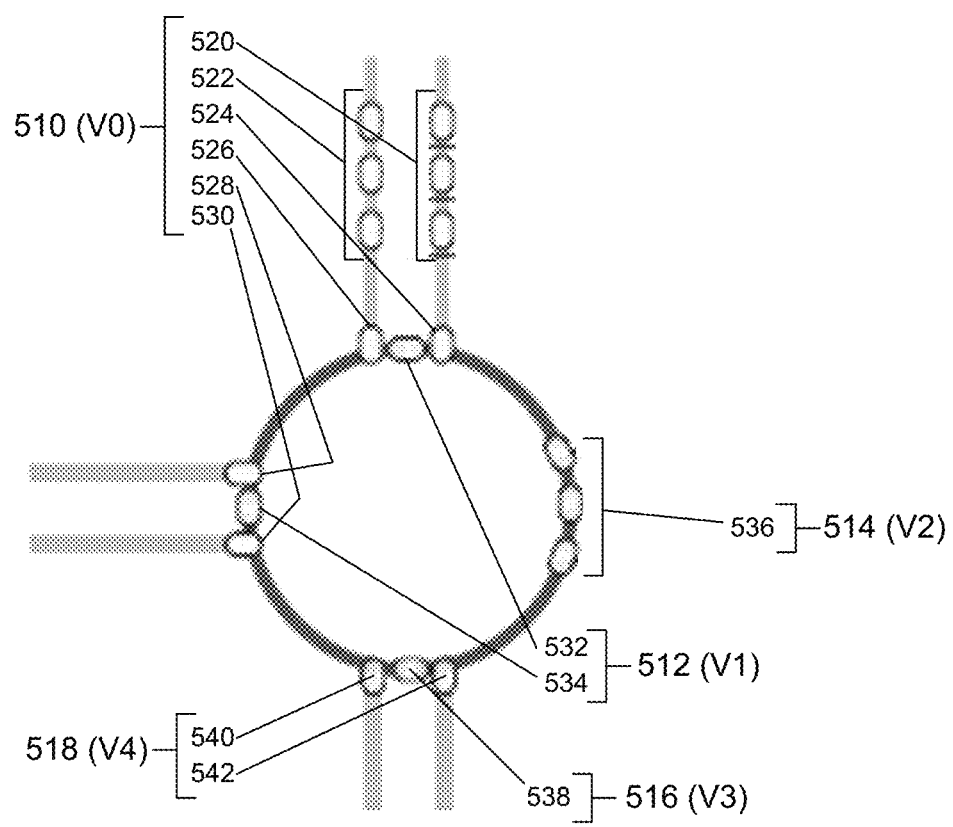
FIG. 5 is a diagrammatic view of a liquid handling ring mixer including groups of valves and pumps that are actuated simultaneously to meter, mix, incubate, and wash fluids.

FIG. 5 is a diagrammatic view of a liquid handling ring mixer including groups of valves and pumps 510, 512, 514, 516 and 518, that are actuated simultaneously to meter, mix, incubate, and wash fluids. The valves and pumps are grouped into five distinct groups, valve group V0, valve group V1, valve group V2, valve group V3, and valve group V4. In this example, valve group V0 includes oscillator pumps 520 and 522, and valves 524, 526, 528 and 530; valve group V1 includes valves 532 and 534; valve group V2 includes oscillator pump 536; valve group V3 includes valve 538; and valve group V4 includes valves 540 and 542.

Metering is accomplished geometrically by loading specific fractions of the ring, and then mixing is accomplished by circulating the liquids around the ring. Circulatory flow requires peristaltic pumping, which can be accomplished by placing three valves in series, for example the pump in valve group V2, and actuating the valves in a ripple pattern. During the different phases of ring mixer operation, specific valves must be opened, closed, or cycled in order to pump and route liquids appropriately. This typically requires an off-chip connection to each valve, in order to apply pneumatic pressure under computer control.

However, the present invention permits the control signals for driving peristaltic pumping to be generated on chip through the use of an oscillator circuit. Three (see FIG. 3) or five inverter gates (see FIG. 4) are connected in a loop, creating an inherently unstable circuit that oscillates at a frequency that can be defined by adjusting circuit parameters such as resistance and capacitance. Pumps can be switched on and off by controlling the supply of power to each oscillator as discussed above.

To achieve semi-autonomous liquid handling, the activation of a single input line must subsequently activate a specific set of pumps and valves to accomplish a particular operation. The routing of these multiple signals is accomplished by a combinatorial Boolean logic block. For ease of notation, the four liquid handling states (meter, mix, incubate, and wash) are denoted as S0 through S3, respectively. All on-chip valves and pumps involved with fluidic control were grouped based on which states they were active in, as illustrated in FIG. 5. For example, all valves in group V0 should open and close together, depending on the operation being executed.

Figure 6:
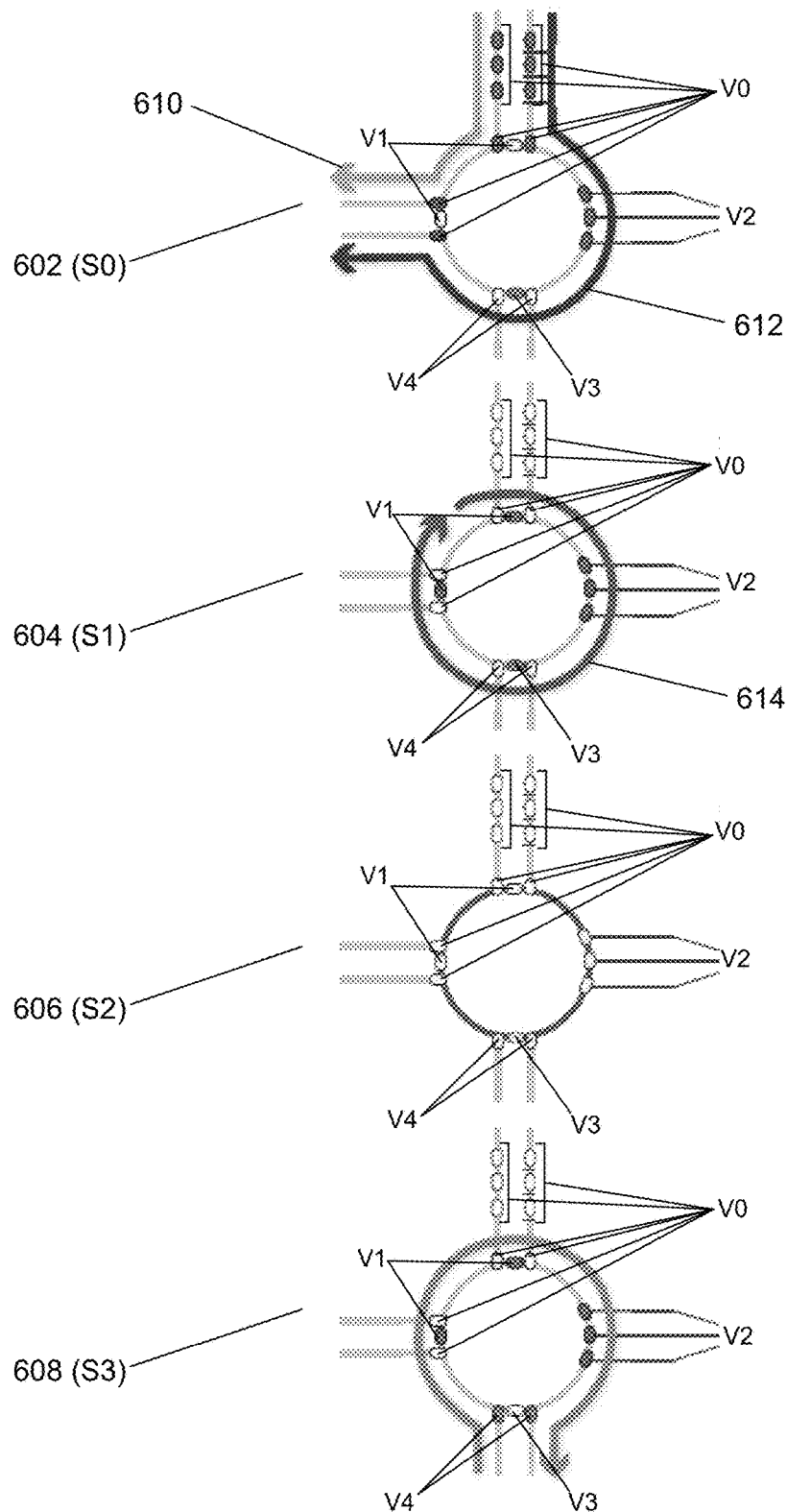
FIG. 6 is a diagrammatic view of a liquid handling ring mixer operating to pump and route fluids in four different ways by actuating various groups of valves and pumps.

FIG. 6 is a diagrammatic view of a liquid handling ring mixer operating to pump and route fluids in four different ways by actuating various groups of valves and pumps. In the meter state 602 (S0), valve groups V0, V2, and V3 are actuated or opened, as indicated by the shaded ovals, allowing a first liquid 610 and a second liquid 612 to be precisely metered at a ratio of 3:1. In the mix state 604 (S1), mixing is achieved by closing off valves to isolate the ring and circulating liquid 614 around the ring. This is accomplished by actuating or opening valve groups V1, V2, and V3. In the incubate state 606 (S2), the ring is isolated, but without circulation. This is accomplished by actuating none of the valve groups. In the wash state 608 (S3), another valve is opened to allow buffer solution to enter the ring, and the liquid is pumped around the ring until the reagents are completely displaced by buffer. This is accomplished by actuating valve groups V1, V2, and V4.

Boolean logic can be implemented in microfluidics and utilized to coordinate the actuation of numerous integrated valves to accomplish fundamental liquid handling functions. Four static inputs, plus an additional static vacuum line for power, may be sufficient to control a network of 31 microfluidic valves. While operations such as on-chip peristaltic pumping typically require computer control, implementations of the claimed invention require simple static on-off inputs, which can be accomplished, for example, by manual twist valves.

Simple Boolean equations can be created that show when a given valve group should be active:

$$V0 = S0$$

$$V1 = S1 + S3$$

$$V2 = S0 + S1 + S3$$

$$V3 = S0 + S1$$

$$V4 = S3$$

For example, all valves in group V1 will be open during state S1 (mixing) and state S3 (washing). In Boolean logic, this is equivalent to an OR gate: in state 1 OR state 3, valves in group V1 should be activated. These Boolean equations can then be translated into the actual mask design for a combinatorial logic block.

Figure 7:
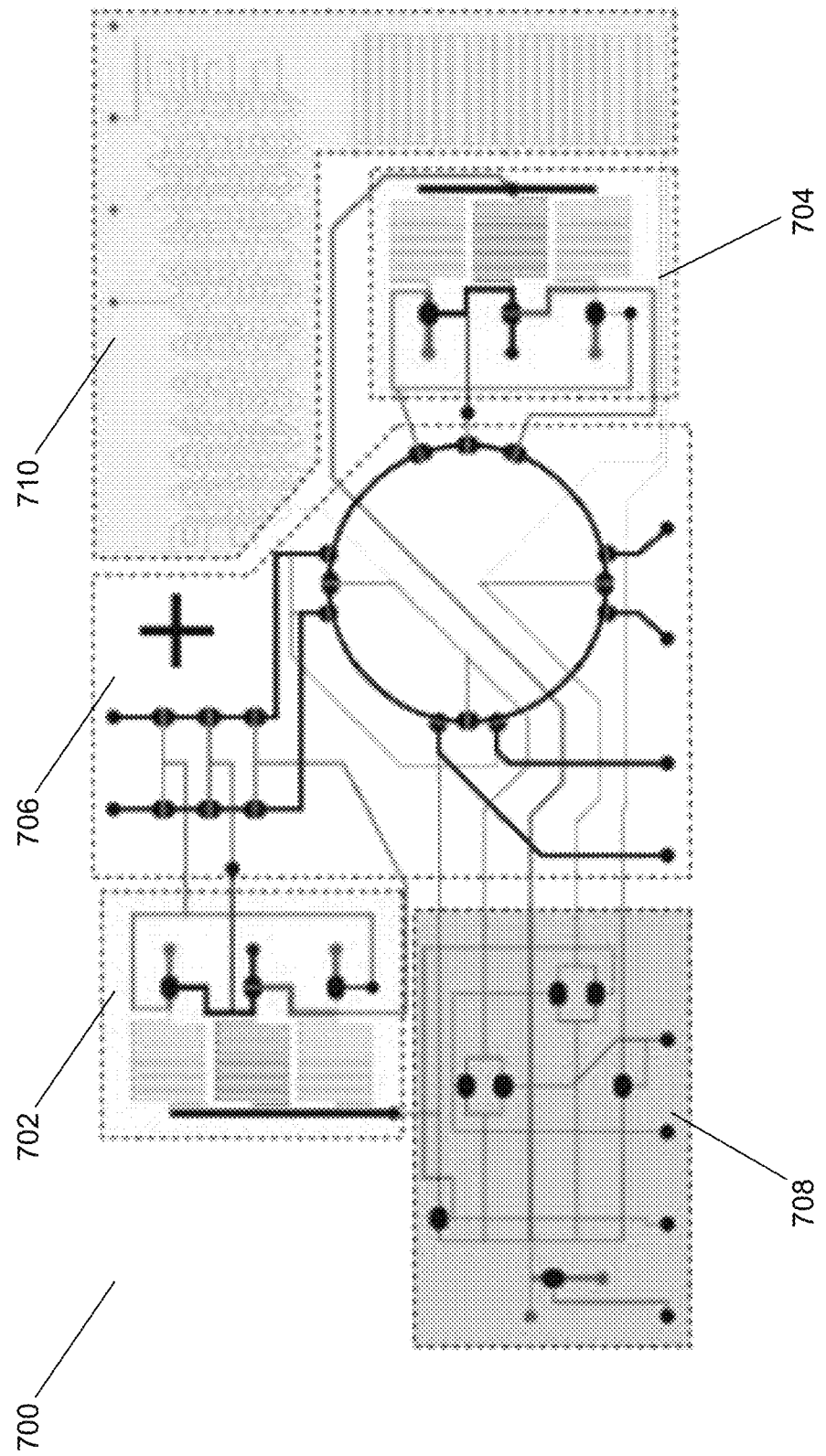
FIG. 7 is a diagrammatic representation of a mask layout for an entire liquid handling system.

FIG. 7 is a diagrammatic representation of a mask layout for an entire liquid handling system 700. Fluid handling components 706, including the ring mixer, handle the metering, mixing, incubation, and washing of the liquids. The on-chip oscillator circuits 702, 704 drive the peristaltic pumps of the ring mixer for routing and mixing of fluids. A combinatorial logic block 708 provides the logic for determining which groups of valves and pumps to actuate. A signal from the combinatorial logic block 708 to an oscillator circuit 702 or 704 will activate the oscillator circuit and drive the peristaltic pump of the ring mixer in the fluid handling component 706. The liquid handling system 700 also includes a pulldown network 710.

The system may be controlled by four static parallel inputs. This design decision makes the system amenable to control by on-chip circuitry such as finite state machines (FSM). The FSM is a classic microcontroller architecture that can step through a series of operations according to a set of programmed rules. At each particular program step, or state, the FSM calculates its next state based on its current state and any available inputs. An FSM could be used to trigger liquid handling control lines according to a timed, programmed sequence. In the future, the combination of an FSM, a clock reference, and a liquid handling circuit could potentially realize self-contained fully autonomous liquid processing chips. These single-chip systems could offer significant advantages in terms of size, ease of use, and manufacturing cost (since they are fully batch fabricated), compared to current systems that are composed of both microfluidic and electronic components, plus a pneumatic system to interface between the two.

Figure 8:
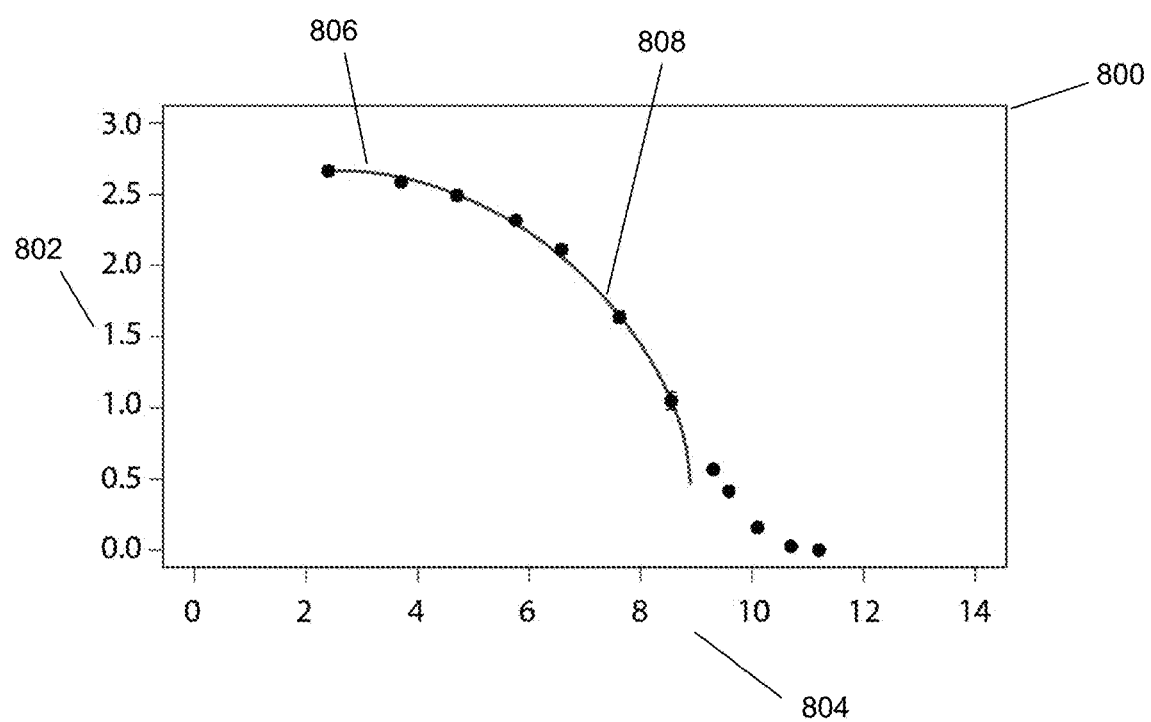
FIG. 8 is a graphical representation of the relationship between the supply vacuum pressure and the oscillation frequency of the oscillator circuit.

In some implementations of the invention, the vacuum supply pressure may vary. Moreover, the oscillation frequency may vary as a function of supply pressure, that is, the oscillator frequency may decrease as the supply vacuum strength decreases. FIG. 8 is a graphical representation 800 of the relationship between the supply vacuum pressure (psia) 804 and the oscillation frequency (Hertz) 802 of the oscillator circuit. Interestingly, the greatest frequency drop 808 occurs between 5 and 10 psia. Below 5 psia 806, the frequency change is relatively small, which is beneficial because the oscillator is thus somewhat robust against small to moderate deviations in the supply vacuum pressure. As the supply vacuum pressure decreases from 2 psia, for example, the opening time increases while the closing time decreases. Thus the two effects partially counteract each other initially. On the one hand, decreased vacuum supply results in decreased drive current, resulting in slower opening time. On the other hand, during closing, decreased vacuum supply means that the valve pressure starts out closer to the threshold, thus resulting in faster closing time. As the vacuum supply continues to decrease, the opening time begins to dominate and the oscillation frequency drops off rapidly. The modulation of oscillator frequency by the variation of supply vacuum pressure is a possible way for tuning the pumping rate of a peristaltic pump driven by the oscillator.

In some implementations, the microfluidic oscillator circuit may have a total volume comprising the volume of the pneumatic or hydraulic valves of the inverter logic gates and the volume of the channels connecting the pneumatic or hydraulic valves. The oscillation frequency of the circuit may vary as a function of the volume of the microfluidic oscillator circuit. For example, adding volume to a channel near a pneumatic or hydraulic valve of an inverter logic gate will add to the volume that must be filled or evacuated when the valve is opened or closed, which impacts the time required. Increasing the volume of an oscillator circuit may thus cause the oscillation frequency to decrease in some implementations. The modulation of oscillator frequency by the variation of total volume of the microfluidic oscillator circuit is a possible way for tuning the pumping rate of a peristaltic pump driven by the oscillator.

In some implementations, the oscillation frequency of the circuit may vary as a function of the pull-up resistance of the inverter logic gates of the circuit. Implementations of the oscillator circuits employ a relatively large pull-up resistor and a short path from the pneumatic valve to ground, causing the oscillation frequency of the oscillator circuit to scale linearly with the inverse of the pull-up resistance of the resistor up to a particular frequency at which the frequency plateaus. The resistor length at which the frequency begins to plateau is the point at which the resistance of the pull-up resistors is dominated by parasitic resistance in the circuit. Parasitic resistance may dominate in circuits with smaller pull-up resistors, such that the pull-up resistors may contribute negligibly to the total resistance of the oscillator circuit.

Figure 9A:
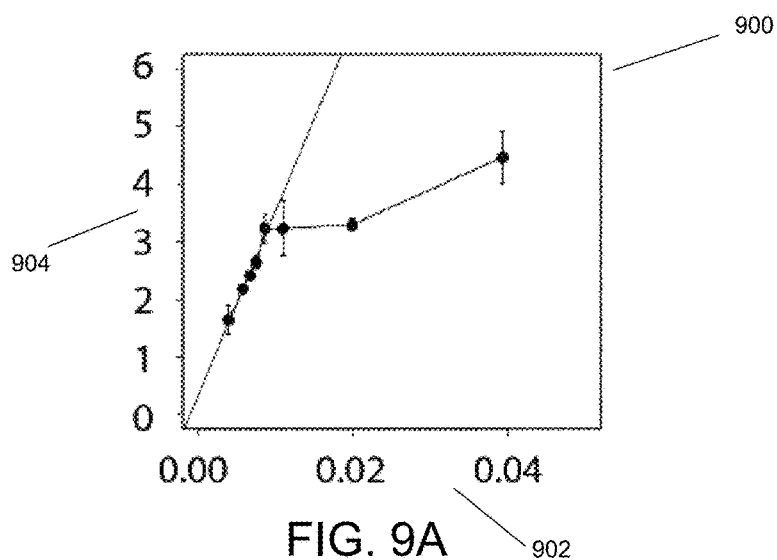
FIG. 9A is a graphical representation of the relationship between the inverse resistor length of the pull-up resistors of an oscillator circuit and the oscillation frequency of the oscillator circuit.
Figure 9B:
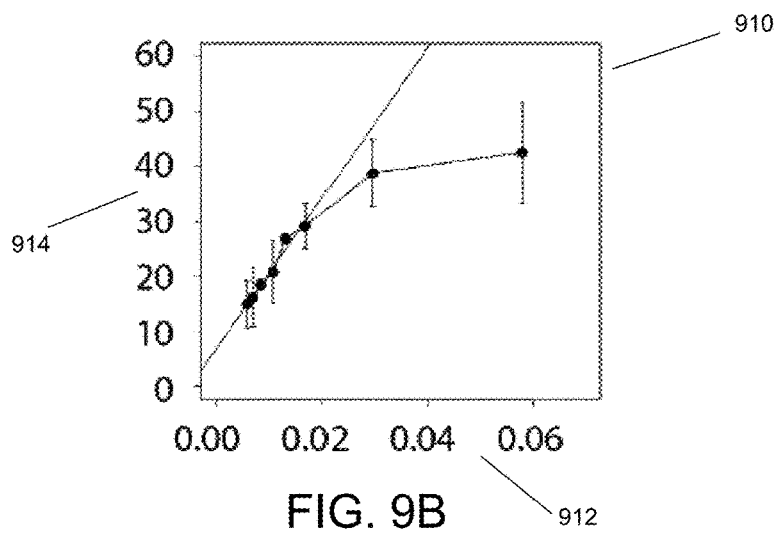
FIG. 9B is a graphical representation of the relationship between the inverse resistor length of the pull-up resistors of an oscillator circuit and the oscillation frequency of the oscillator circuit, wherein parasitic resistance in the oscillator circuit has been minimized.

FIG. 9A is a graphical representation 900 of the relationship between the inverse resistor length (mm$^{-1}$) 902 of the pull-up resistors of an oscillator circuit and the oscillation frequency (Hz) 904 of the oscillator circuit. The oscillation frequency scales linearly with the inverse of the pull-up resistance until plateauing at about 5 Hz. FIG. 9B is a graphical representation 910 of the relationship between the inverse resistor length (mm$^{-1}$) 912 of the pull-up resistors of an oscillator circuit and the oscillation frequency (Hz) 914 of the oscillator circuit, wherein parasitic resistance in the oscillator circuit has been minimized. Reducing parasitic resistances in the circuit layout by, for example, reducing the interconnect length of the circuit, may allow the oscillation frequency to increase by an order of magnitude, reaching almost 50 Hz before plateauing.

A possible advantage of microfluidic logic systems is that they could be operated without electricity, which might be useful for limited resource settings or radiation hard applications. A number of manually operated vacuum sources may be used and may maintain adequate supply pressure for a period of time while running an oscillator circuit.

Figure 10:
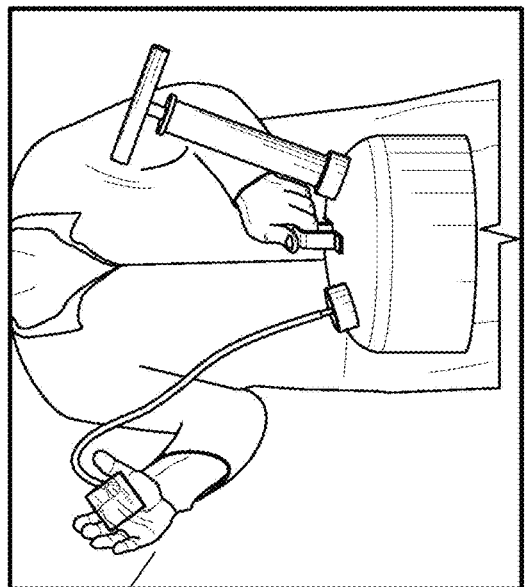
FIG. 10 is a pictorial and graphical representation of the use of manual vacuum sources to maintain supply pressure while running an oscillator circuit.
Figure 10:
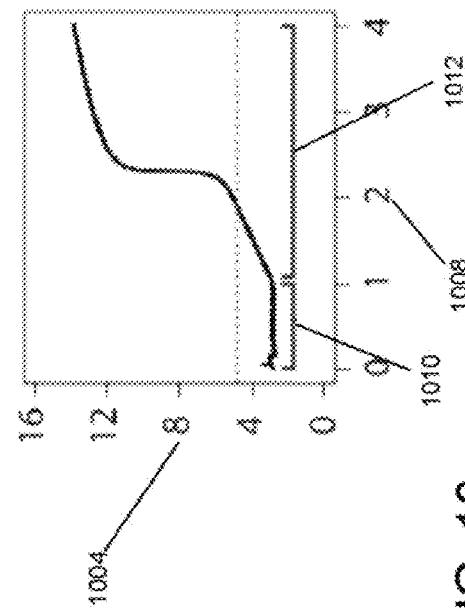
Figure 10:
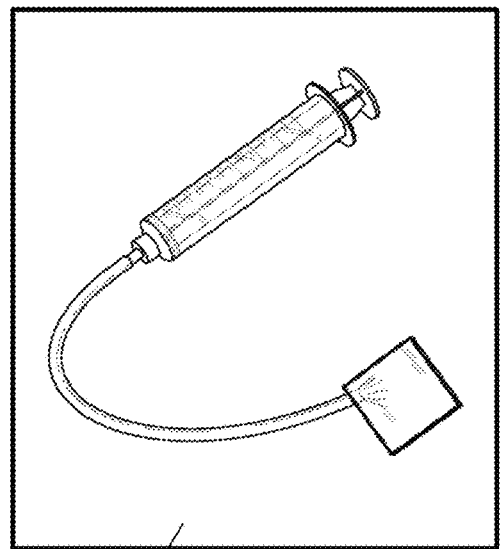
Figure 10:
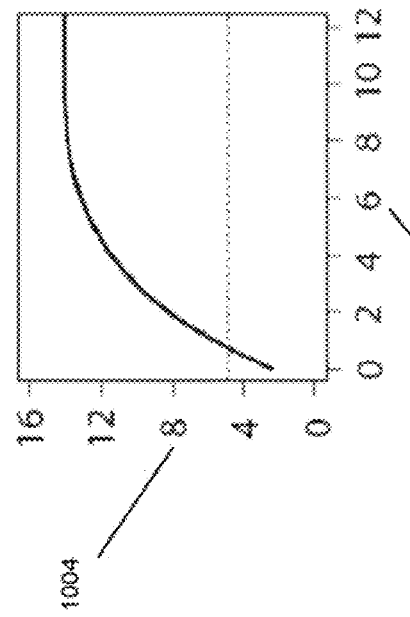

FIG. 10 is a graphical representation of the use of manual vacuum sources to maintain supply pressure while running an oscillator circuit. The graphs in FIG. 10 include a pressure (psia) axis 1004 and a time (minutes) axis 1006 or a time (hours) axis 1008. Five psia may be defined as the minimum supply pressure, since oscillator frequency is maintained within a 10% deviation as long as the vacuum supply is held above this threshold. A single pull of a 60-mL syringe 1000 may create enough pressure to run an oscillator circuit for 1 minute. A bicycle pump 1002 connected to a storage container is able to sustain circuit operation indefinitely with intermittent pumping (6 strokes per minute) 1010, and continued to maintain adequate pressure for about an hour after pumping ceased 1012. A hand pump or mouth suction may also be successful in powering oscillator activity.

Returning to the ring oscillator circuit (see FIGS. 2B and 2C), frequency stability is one of the most critical qualities of a frequency reference. In order to characterize frequency drift, the frequency of a pneumatic oscillator may be recorded over 400 minutes of continuous operation, revealing a shift from 2.6 Hz to 3.2 Hz, or 4% per hour.

A drift towards higher oscillation frequencies may occur if the threshold shifted such that weaker vacuum pressures became sufficient to open the valve. A possible mechanism for such a shift in threshold is a change in PDMS-glass adhesion at the valve seat. It has been determined that PDMS surface properties may change over time due to the diffusion of low molecular weight chains from the bulk of the PDMS to the surface. Importantly, the PDMS surface can be stabilized by accelerated aging through thermal curing.

Figure 11:
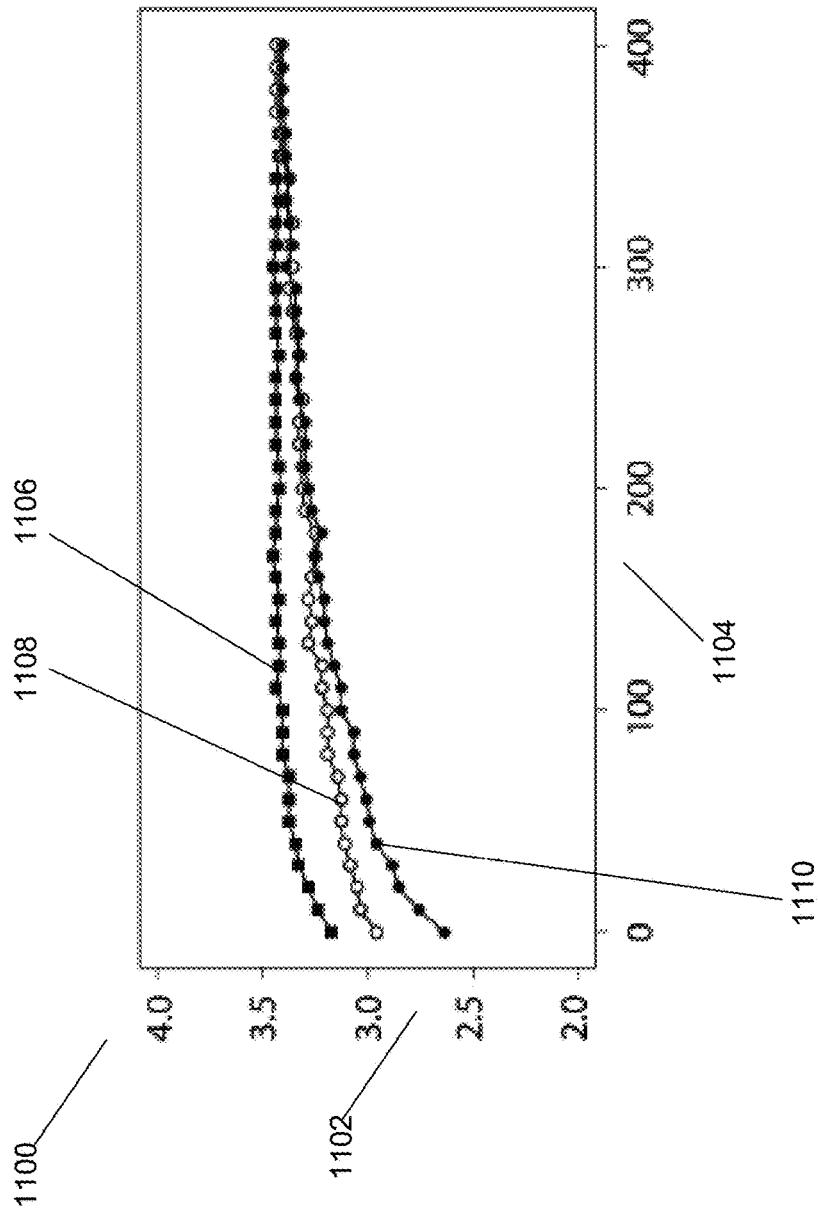
FIG. 11 is a graphical representation of the effect of thermal curing on oscillation frequency stability.

FIG. 11 is a graphical representation of the effect of thermal curing on oscillation frequency stability. The graph 1100 includes a frequency (Hz) axis 1102 and a time (minute) axis 1104. The first line 1106 demonstrates the effect of thermal curing at 120° C. for 15 hours of the assembled ring oscillator prior to operation. The second line 1108 demonstrates the effect of thermal curing at 85° C. for 15 hours of the assembled ring oscillator prior to operation. The third line 1110 demonstrates the oscillation frequency stability of an assembled ring oscillator without thermal curing. As illustrated in FIG. 11, thermal curing (or annealing) of assembled ring oscillators prior to operation, at 85° C. or 120° C. for 15 hours both result in notably reduced frequency drift, with the 120° C. treatment reducing drift to less than 1% per hour, demonstrating that thermal annealing of the oscillator circuit may improve stability of the oscillation frequency of the oscillator circuit. This amount of timing accuracy is suitable for controlling typical biochemical reactions for point-of-care diagnostics and many other lab-on-a-chip applications.

Figure 12:
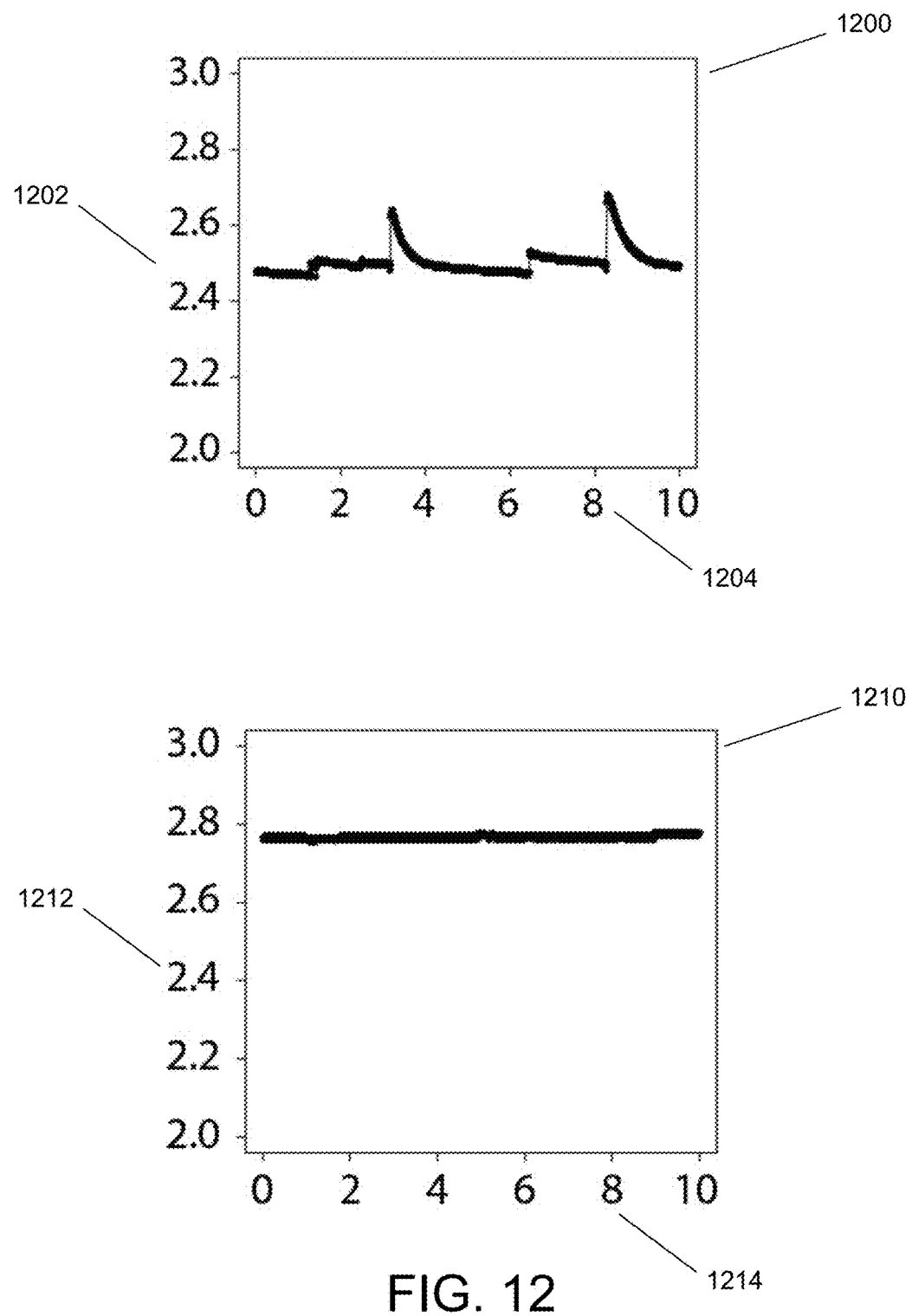
FIG. 12 is a graphical representation of the effect of the number of inverters on short-term frequency variation.

In addition to long-term frequency drift, another figure of merit for frequency references is short-term variance, also known as jitter. FIG. 12 is a graphical representation of the effect of the number of inverters on short-term frequency variation. The first graph 1200 presents the oscillation frequency (Hz) 1202 of a 3-inverter oscillator plotted as a function of time (minutes) 1204. As shown in the first graph 1200, the 3-inverter ring oscillator exhibits a number of fluctuations away from the baseline frequency of approximately 2.5 Hz over a 10-minute span, with a standard deviation of 1.4%. In contrast, the second graph 1210, which presents the oscillation frequency (Hz) 1212 of a 13-inverter oscillator plotted as a function of time (minutes) 1214, exhibits more stable behavior, with a standard deviation of 0.1%. This is likely related to the fact that in the larger ring, the switching of a single inverter occupies a smaller duty cycle, giving more opportunity for transients to settle before it comes time to switch again. Importantly, oscillator period scales with the number of inverter stages, hence similar frequencies can be achieved by either a few large inverters or many small inverters. Hence, frequency jitter can be reduced in ring oscillators by adding inverter stages without needing to sacrifice a large amount of additional chip real estate.

Although certain of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, the embodiments described above may be implemented using a variety of materials. Therefore, the scope of the invention should be determined with reference to the appended claims.

What is claimed is:

1. A pump comprising:
(a) a pressure oscillator circuit, comprising:
(i) a plurality of channels to route a flow of a gas or liquid, and
(ii) one or more vacuum-pressure driven pneumatic inverter logic gates each exhibiting a gain,
(b) a plurality of fluid channels effective for a coordinated movement of the flow of the gas or liquid,
wherein each of the one or more inverter gates comprises:
a pneumatic or hydraulic membrane valve, having a membrane valve control channel, a membrane valve input channel and a membrane valve output channel,
wherein when vacuum pressure is applied to the membrane valve control channel, the pneumatic or hydraulic membrane valve opens allowing the gas or liquid to flow from the membrane valve input channel to the membrane valve output channel,
wherein when atmospheric pressure is applied to the membrane valve control channel, the pneumatic or hydraulic membrane valve closes,
wherein each of the one or more inverter gates further comprises a pull-up resistor channel, wherein the pull-up resistor channel comprises a long narrow channel separating a vacuum supply source from the output of the pneumatic or hydraulic membrane valve, wherein each pull-up resistor channel has a pull-up resistance that varies as a function of the length of the long narrow channel, wherein the oscillation frequency of the pressure oscillator circuit varies as a function of the pull-up resistance.

* * * * *